United States Patent [19]

Kent

[11] 4,408,632
[45] Oct. 11, 1983

[54] HIGH FLOW SHROUD CHECK VALVE

[75] Inventor: Preben Kent, Altadena, Calif.

[73] Assignee: Brunswick Corporation, Skokie, Ill.

[21] Appl. No.: 257,224

[22] Filed: Apr. 23, 1981

[51] Int. Cl.³ .............................................. F16K 15/00
[52] U.S. Cl. .......................... 137/516.29; 251/DIG. 1
[58] Field of Search ............ 137/247.17, 469, 516.25, 137/516.27, 516.29; 251/DIG. 1

[56] References Cited

U.S. PATENT DOCUMENTS

| 2,918,083 | 12/1959 | Clark, Jr. et al. | 137/516.25 |
| 3,626,977 | 12/1971 | Riley | 137/516.25 |
| 4,096,884 | 6/1978 | Horowitz | 251/DIG. 1 |

FOREIGN PATENT DOCUMENTS

| 2129800 | 1/1973 | Fed. Rep. of Germany | 137/469 |
| 12911 | of 1905 | United Kingdom | 137/516.29 |

OTHER PUBLICATIONS

Circle Seal Products Co., Inc. Publication Aug. 5, 1969, Pertinet pages, 1, 3, 9.

Primary Examiner—Martin P. Schwadron
Assistant Examiner—John Rivell
Attorney, Agent, or Firm—Wood, Dalton, Phillips, Mason & Rowe

[57] ABSTRACT

A check valve or relief valve is provided with a floating shroud having a retaining lip engaging with a downstream edge of a moving poppet to maintain the shroud and a captured seal ring in proximate relationship with the poppet to maximize the usefulness of the flow ports in the poppet and to eliminate seal ring flutter. The retaining lip of the shroud may have axially directed holes to create a reduction in pressure between the seal ring and the poppet seat to move the seal ring against the poppet seat during high flow conditions.

18 Claims, 2 Drawing Figures

HIGH FLOW SHROUD CHECK VALVE

DESCRIPTION

1. Technical Field

This invention relates to a check or relief valve and, more particularly, to a floating high flow shroud and O-ring construction for a check or relief valve.

2. Background Art

Check or relief valves for fluid flow have been known and used for a long time. At one period of time, a movable poppet in the valve was spring-urged against a mating seat to cut off fluid flow. The poppet and seat had to mate precisely and be properly aligned at the point of sealing in order to be effective. Distortion, pitting of the mating elements, nonconcentricity of the mating elements, foreign bodies on one or the other of the mating elements, and the like, caused leaks or other failures of the valves.

With the discovery of the use of seal rings for valves to assist in effecting a complete seal, many of the problems mentioned above were resolved, but new ones resulted. The seal rings were positioned between the mating elements of the valve and cooperated with the mating elements to create the seal. The seal ring, being free to float in the area between the mating surfaces when the valve was opened, sometimes dilates preventing a good seal. At other times, the seal ring was washed out during opening of the valve thereby losing the sealing effect of the seal ring. Occasionally, the seal ring had a tendency to flutter between the mating elements partially covering and uncovering the flow holes in the poppet in an erratic and unpredictable manner. Occasionally, the seal ring will settle against an angular sealing surface of the inlet fitting end, thus tending to cover the largest flow area of the circular holes in the poppet.

One prior art patent, U.S. Pat. No. 3,626,977 to Riley et al, issued Dec. 14, 1971, and assigned to the common assignee of the present invention, provides a retainer ring for the seal ring to prevent dilation of the seal ring to limit freedom of movement of the seal ring to the immediate vicinity of the poppet valve seat to firmly and accurately align the seal ring along its full seating surface. Although the solution set out in U.S. Pat. No. 3,626,977 solved the problems for one style check or relief valve, the retaining ring concept was not usable on many styles of valve.

Another prior art patent, U.S. Pat. No. 2,918,083 to Clark et al, issued Dec. 22, 1959, provides a multifaceted cage trapped to the fixed valve member and forming a backing for a poppet spring so as to urge the poppet against a seal ring and valve seat. The cage trapped the seal ring against a shoulder on the poppet in a generally concentric manner so that movement of the poppet moved the seal ring against a part of the fixed valve seat. It was found that fluid could flow (particularly high pressure fluid) between the seal ring and shoulder on the poppet and unseat the seal ring. The seal ring could then vibrate, cant, or otherwise misbehave with the same problems recited hereinabove.

The present invention is directed to overcoming one or more of the problems as set forth above.

DISCLOSURE OF INVENTION

In one aspect of the present invention, a check or relief valve is provided with a poppet valve element slidable relative to a male body member. The poppet and male body member have mating valve seats which are adapted to abut each other for sealing purposes with a secondary valve seat on an external annular flange on the poppet aligned with, but out of contact with, a secondary valve seat on the body member. a resilient seal ring is positioned between said secondary valve seats, such that when the mating valve seats are in sealing contact, the resilient seal ring will be compressed into sealing relationship between the secondary valve seats.

A floating shroud encircles the external annular flange, the secondary valve seat on the poppet, and the resilient seal ring with an apertured lip on the shroud radially overlapping the external annular flange on the poppet. An annular flange axially spaced from the lip on the shroud radially overlaps the seal ring. The shroud enslaves the seal ring to move the ring forward with the poppet and to hold the ring out of the mainstream of flow through the flow holes in the poppet. The shroud maximizes the usefulness of the flow holes in the poppet, eliminates seal ring flutter, prevents seal ring expansion due to differential pressure across the ring thereby eliminating washing the seal ring off the poppet.

During high flow, the flow around the poppet will create a reduction in pressure behind the apertures in the annular lip in the shroud, thus moving the seal ring against the secondary valve seat on the poppet to firmly retain the seal ring against distortion and flutter. As the differential pressure across the poppet decays with diminishing flow demand of the system, the poppet will be moved toward the sealed position under pressure from the spring and, since the shroud is free to float within the limitations of the poppet flange outside diameter, it will self-center for perfect sealing between the secondary valve seats.

BEST MODE FOR CARRYING OUT THE INVENTION

Figure 1:
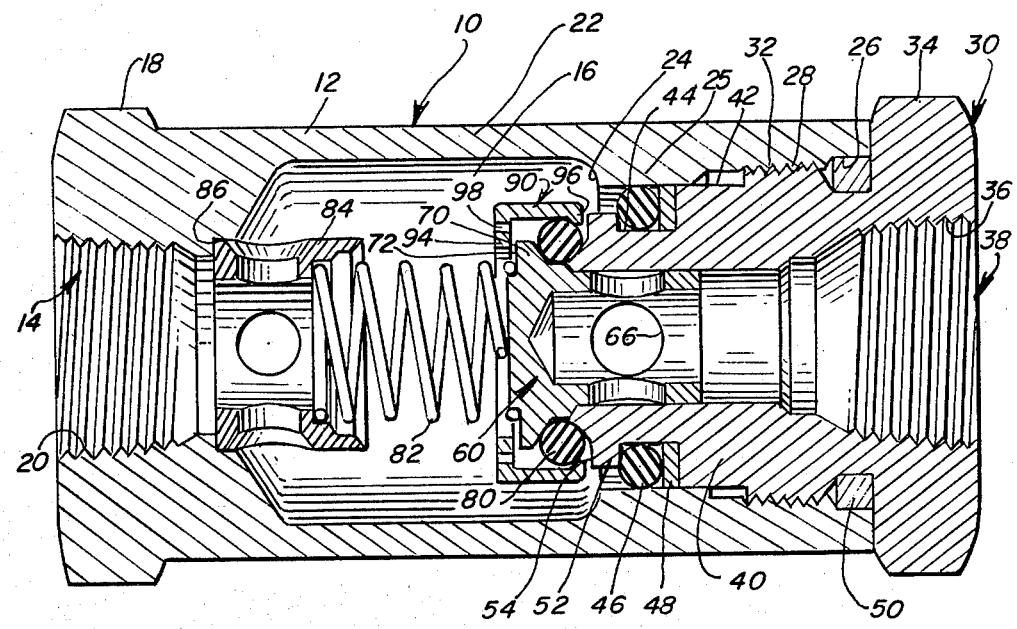
FIG. 1 is a vertical sectional view through the mid portion of a check or relief valve showing the improved shroud structure with the valve closed.
Figure 2:
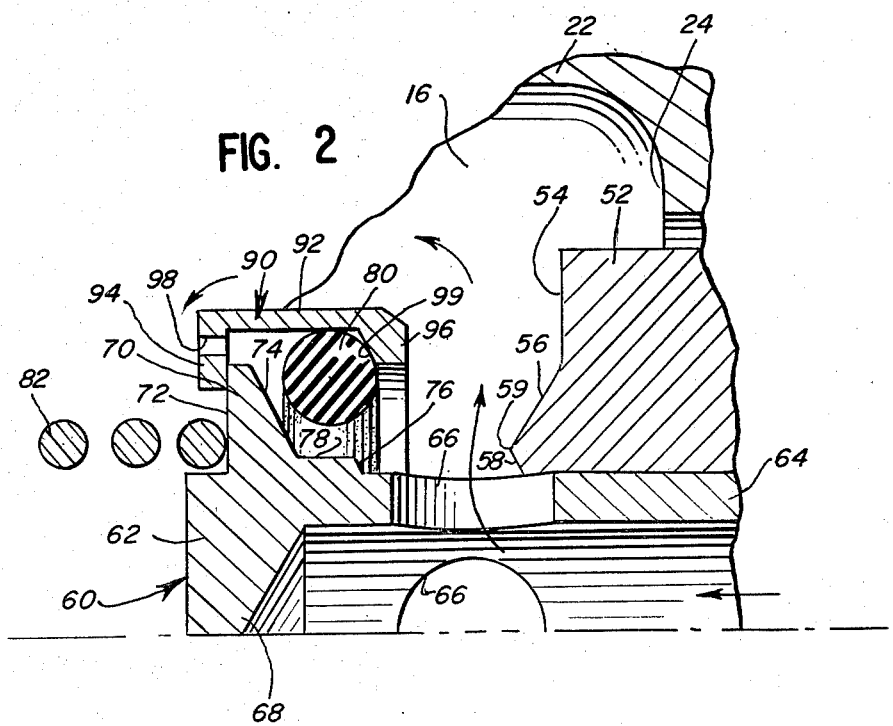
FIG. 2 is an enlarged broken away view of the poppet and shroud of FIG. 1 only showing the valve in the open position.

Referring to the drawings, a check or relief valve 10 embodying the invention is illustrated and includes a housing 12 having an outlet port 14 and a valve chamber 16. The outlet port 14 is formed in a polygonal head portion 18 and has internal threads 20 for connection to a conduit, not shown. The valve chamber 16 is formed in a cylindrical portion 22 of the housing 12 and communicates at one end with the outlet port 14 and has the other end partially defined by a shoulder 24 on a radially inwardly directed flange 25. The cylindrical portion 22 of the housing has an opening 26 at the end opposite the outlet port 14, in which opening 26 is formed internal threads 28.

An inlet fitting 30 has external threads 32 threaded in the threads 28 in the housing and includes a polygonal head portion 34 provided with internal threads 36 to define an inlet port 38 for connection to a fluid conduit conveying fluid to the valve 10. The inlet fitting 30 has an elongate hollow cylindrical extension 40 extending forward of the head portion 34 with said threads 32 formed thereon. The extension 40 has one axial portion 42 having a diameter fitting in the inside of the flange 25. A reduced diameter annular recess 44 is provided in said extension 40 forward of the axial portion 42 for receiving and retaining an O-ring seal 46 and a spacer seal 48 therein. The O-ring seal 46 and spacer seal 48 bear against the inside of the flange 25 and against the base of the recess 44 to effect a seal between the inlet fitting 30 and the housing 12. A packing gland or gasket 50 is seated between the head portion 34, the inner surface of the opening 26 in the housing and the cylindrical extension 40 of the fitting 30 rearward of the threads 32. The gland or gasket 50 further seals the fitting to the housing. A collar 52 defines one wall of the recess 44 and provides a forwardly-facing flat surface 54 which merges into an axially outwardly tapered annular valve seat 56 and an axially rearwardly tapered annular valve seat 58, the two valve seats 56,58 meeting at a ring-shaped apex 59. Both valve seats 56,58 are of substantially equal importance in the flow shut off function, but for definition purposes and since seat 58 is the first seat in the flow path, seat 58 will occasionally be referred to hereinafter as a primary sealing surface and seat 56 will be referred to as a secondary sealing surface.

A poppet valve or member 60 is slidably carried by the extension 40 of the inlet fitting 30 and includes a cylindrical body portion 62 having an outwardly extending sleeve 64 with a plurality of flow ports 66 extending through the sleeve to permit flow between the inside and the outside of the sleeve. The body portion 62 defines a closed wall 68 in axial alignment with the sleeve 64 and has a radially outwardly extending flange 70 around the outer periphery thereof. The flange 70 has a flat surface 72 facing away from the sleeve 64 and has an axially rearwardly tapered annular valve seat 74 facing in the direction of the sleeve 64. Another axially rearwardly tapered annular valve seat 76 is formed on said flange 70 and is axially spaced by an axial land 78 from said valve seat 74. The valve seat 76 joins the sleeve portion 64 of the poppet valve 60 in axially spaced relationship from the flow ports 66 for a purpose that will become apparent hereinafter. As discussed above with seat 58, the valve seat 76 will be referred to as a primary sealing surface and is in alignment with and is intended to seat against the primary sealing surface on the seat 58.

An annular, resilient, flexible seal ring or O-ring 80 encircles the land 78 of the poppet 60 and is of a size that when the poppet 60 is in position with the seat 76 substantially in contact with the seat 58, the seal ring will be compressed between the rearwardly tapered valve seat 74 on the poppet 60 and the outwardly tapered valve seat 56 on the inlet fitting 30.

A spring 82 is located in the valve chamber 16 and extends between the flat surface 72 of the poppet valve 60 and an apertured flow director 84 seated in an annular recess 86 in the tapered wall of the housing 12. The spring urges the sleeve 64 of the poppet valve 60 into the inlet fitting 30 and seats the seat 76 on the poppet against the seat 58 on the fitting and compresses and seals the seal ring 80 between the seat 74 on the poppet and the seat 56 on the fitting. The flow ports 66 are within the sleeve 64 so that flow of fluid through the poppet and past the seated valve seats is prevented.

In one preferred embodiment of the invention, a shroud 90 encircles both the flange 70 of the poppet and the seal ring 80. The shroud 90 includes a cylindrical portion 92 having a radially inwardly directed lip 94 at one end and a radially inwardly directed flange 96 at the other end. The lip 94 extends radially inward in radially overlapping relationship with the outer portion of the flange 70 and forward of said flange 70. A plurality of apertures 98, for instance four in number, extend in an axial direction through said lip and out of alignment with said flange 70 when said shroud is concentric with said poppet 60. The flange 96 on the shroud projects radially inward in overlapping relationship to the seal ring 80 and confines the seal ring 80 to the space between the inner wall 99 of the flange 96 and the rearwardly tapered valve seat 74 on the flange 70. The shroud is dimensioned so that the flange 96 and seal ring 80 are substantially radially out of alignment with the flow ports 66 during flow through the valve.

INDUSTRIAL APPLICABILITY

With the valve 10 in a flow line, the spring 82 will close the valve by seating the seats 76 on poppet 60 against seat 58 on the fitting 30 and by seating the seal ring 80 between the seat 74 on the poppet and the seat 56 on the fitting. When the pressure force of fluid in fitting 30 exceeds the calibrated loading of the spring 82, the poppet 60 will move to the left opening the flow path through the flow ports 66. The opening of the valve and operation of the poppet is according to conventional practice.

As the poppet 60 moves to the left in the drawings, the flange 70 engages with the lip 94 and moves the shroud 90 and seal ring 80 with it, clearing the flow path. The shroud 90 and flange 96 restrain the seal ring 80 preventing flutter of the seal ring, dilation of the seal ring and displacement of the seal ring from its proper location on the poppet. During high flow through the valve, the fluid flowing past the shroud 90 and apertures 98 in the lip 94 creates a reduced pressure in the shroud on the inside of the lip which pulls the seal ring 80 against the valve seat 74 further enhancing the stability of the valve. With the seal ring held out of the flow path, either by the flange 96 or by the reduction in pressure during high flow, the possibility of flutter of the seal ring or the possibility of expanding the seal ring due to differential pressure with the subsequent possibility of being washed off the poppet, are eliminated. The shroud and flange hold the seal ring in a concentric configuration and guide the seal ring into close proximity with the mating seats 74,56 so that the seal ring can selfcenter and seat properly on the seats 74,56 for a complete seal of flow through the poppet.

I claim:

1. In a check valve having a valve body comprised of a housing having a valve chamber, an inlet fitting extending into said valve chamber and having concentric sealing surfaces facing into said valve chamber, a poppet valve positioned in said valve chamber and being slidably mounted relative to said inlet fitting, flow ports through said poppet valve, concentric sealing surfaces on said poppet valve downstream from said flow ports, one of the sealing surfaces on said inlet fitting aligning with a sealing surface on said poppet valve, a second sealing surface on said poppet valve aligning with a second sealing surface on said inlet fitting, an annular resilient seal ring encircling said poppet valve in alignment with the second sealing surface on said poppet valve, and means for moving said poppet valve to seal said one sealing surface on the inlet fitting and poppet against each other and to seal said seal ring between said two second sealing surfaces, in combination: shroud means encircling said seal ring and said second sealing surface on said poppet valve and movable relative to said poppet valve, means for moving said shroud means with said poppet valve as said poppet valve is moved to the open position, and means for retaining said seal ring concentrically enclosed in said shroud means as said poppet valve is opened and closed.

2. A valve as claimed in claim 1 wherein said shroud means and said means for retaining said seal ring in said shroud positions said seal ring out of radial alignment with said flow ports in said poppet valve.

3. A valve as claimed in claim 1 wherein said means for moving said shroud means with said poppet valve comprises a lip on said shroud extending radially inward into radially overlapping relationship with a flange on said poppet valve, said flange engaging with said lip to move said shroud means and seal ring in an axial direction with said poppet valve during opening of said valve.

4. A valve as claimed in claim 3 wherein axially directed apertures are formed in said lip out of alignment with said flange, high flow through the open poppet valve reduces pressure in said apertures to seat the seal ring against the second sealing surface on said poppet valve.

5. A valve as claimed in claim 1 wherein said means for moving said poppet valve to the closed position comprises a spring.

6. A valve as claimed in claim 5 wherein said spring is positioned in said valve chamber and bears at one end against said housing and bears at the other end against said poppet valve.

7. A valve as claimed in claim 1 wherein said poppet valve has an axially extending hollow sleeve slidably mounted in said inlet fitting, and wherein said flow ports in said poppet valve move between a closed position within said inlet fitting to a position partially or wholly open into said valve chamber.

8. A valve as claimed in claim 1 wherein said seal ring is an O-ring which contacts an inner surface of said shroud means substantially completely around the outer circumference of said O-ring.

9. A valve as claimed in claims 1 or 2 wherein said means for retaining said seal ring in said shroud means comprises an annular flange projecting inwardly from said shroud means in radially overlapping relationship with said seal ring.

10. In a check valve having a valve body comprised of a housing having a valve chamber with a threaded outlet at one end and an opening at the other end, an inlet fitting secured in said opening and having a primary sealing surface and a secondary sealing surface facing axially into said valve chamber, a poppet valve positioned in said valve chamber and being slidably mounted relative to said inlet fitting, flow ports in said poppet valve between the inside and the outside of said poppet valve, a primary sealing surface on said poppet valve downstream from said flow ports, said primary sealing surface being in alignment with the primary sealing surface on said inlet fitting, an annular flange on said poppet valve defining a secondary sealing surface on said poppet valve, an annular resilient seal ring encircling said poppet valve in alignment with the secondary sealing surface on said poppet valve, means for moving said poppet valve to the closed position to seal said primary sealing surfaces against each other and to seal said seal ring between said secondary seating surfaces, a shroud encircling said seal ring and said annular flange on said poppet valve and movable relative to said poppet valve, means for moving said shroud with said poppet valve as said poppet valve is moved to the open position, and means for retaining said seal ring concentrically enclosed in said shroud as said poppet valve is opened and closed.

11. A valve as claimed in claim 10 wherein said shroud and said means for retaining said seal ring in said shroud positions said seal ring out of radial alignment with said flow ports in said poppet valve.

12. A valve as claimed in claim 10 wherein said means for moving said shroud with said poppet valve comprises a lip on said shroud extending radially inward into radially overlapping relationship with said annular flange on said poppet valve, said annular flange engaging with said lip to move said shroud and seal ring in an axial direction with said poppet valve during opening of said valve.

13. A valve as claimed in claim 12 wherein axially directed apertures are formed in said lip out of alignment with said annular flange, high flow through the open poppet valve reduces pressure in said apertures to seat the seal ring against the secondary sealing surface on said annular flange.

14. A valve as claimed in claim 10 wherein said means for moving said poppet valve to the closed position comprises a spring.

15. A valve as claimed in claim 14 wherein said spring is positioned in said valve chamber and bears at one end against said housing and bears at the other end against said poppet valve.

16. A valve as claimed in claim 10 wherein said poppet valve has an axially extending hollow sleeve slidably mounted in said inlet fitting, and wherein said flow ports in said poppet valve move between a closed position within said inlet fitting to a position partially or wholly open into said valve chamber.

17. A valve as claimed in claim 10 wherein said seal ring is an O-ring which contacts an inner surface of said shroud substantially completely around the outer circumference of said O-ring.

18. A valve as claimed in claims 10 or 11 wherein said means for retaining said seal ring in said shroud comprises an annular flange projecting inwardly from said shroud in radially overlapping relationship with said seal ring.

* * * * *